(12) United States Patent
Herting

(10) Patent No.: US 12,167,946 B2
(45) Date of Patent: Dec. 17, 2024

(54) METHOD FOR PRODUCING A MOLDED BODY AND MOLDED BODY

(71) Applicant: Torsten Herting, Grindelwald (CH)

(72) Inventor: Torsten Herting, Grindelwald (CH)

( * ) Notice: Subject to any disclaimer, the term of this patent is extended or adjusted under 35 U.S.C. 154(b) by 87 days.

(21) Appl. No.: 17/435,212

(22) PCT Filed: Feb. 28, 2020

(86) PCT No.: PCT/EP2020/055343
§ 371 (c)(1),
(2) Date: Aug. 31, 2021

(87) PCT Pub. No.: WO2020/178195
PCT Pub. Date: Sep. 10, 2020

(65) Prior Publication Data
US 2022/0133449 A1     May 5, 2022

(30) Foreign Application Priority Data

Mar. 1, 2019  (EP) .................................... 19160402

(51) Int. Cl.
| | |
|---|---|
| *A61C 13/20* | (2006.01) |
| *A61C 13/00* | (2006.01) |
| *A61C 13/01* | (2006.01) |
| *B29C 33/30* | (2006.01) |
| *B29C 39/10* | (2006.01) |

(52) U.S. Cl.
CPC .......... *A61C 13/20* (2013.01); *A61C 13/0006* (2013.01); *A61C 13/0022* (2013.01); *A61C 13/04* (2013.01); *B29C 33/303* (2013.01); *B29C 39/10* (2013.01)

(58) Field of Classification Search
None
See application file for complete search history.

(56) References Cited

U.S. PATENT DOCUMENTS

| | | |
|---|---|---|
| 2009/0220916 A1 | 9/2009 | Fisker |
| 2010/0035209 A1 | 2/2010 | Jang |

(Continued)

FOREIGN PATENT DOCUMENTS

| | | |
|---|---|---|
| CN | 1310656 A | 8/2001 |
| CN | 101626737 A | 1/2010 |

(Continued)

OTHER PUBLICATIONS

International Search Report for PCT/EP2020/055343, mailed May 7, 2020, 4 pages.

(Continued)

*Primary Examiner* — Alison L Hindenlang
*Assistant Examiner* — Erica Hartsell Funk
(74) *Attorney, Agent, or Firm* — NIXON & VANDERHYE

(57) ABSTRACT

By using key structures which allow an unambiguous relative positioning, it is possible to produce mold blanks consisting of several layers, from which molded bodies can be produced by machining in an automated manner. These bodies may not only have an irregular but predefined shape, but they also have at least one irregular but predefined parting surface between two layers, the positioning on this parting surface relative to the surface being predefined.

13 Claims, 5 Drawing Sheets

(56) References Cited

U.S. PATENT DOCUMENTS

| | | |
|---|---|---|
| 2011/0080476 A1 | 4/2011 | Dinauer et al. |
| 2012/0143369 A1 | 6/2012 | Prust |
| 2013/0167380 A1 | 7/2013 | Balshi |
| 2013/0228611 A1 | 9/2013 | Byars |
| 2014/0178828 A1 | 6/2014 | Jo |
| 2014/0205969 A1 | 7/2014 | Marlin |
| 2015/0245892 A1 | 9/2015 | Grobbee |
| 2015/0342711 A1 | 12/2015 | Grobbee |
| 2018/0042705 A1 | 2/2018 | Howe |
| 2019/0053881 A1 | 2/2019 | Grobbee et al. |
| 2019/0374319 A1 | 12/2019 | Chiou et al. |
| 2020/0055254 A1 | 2/2020 | Geisen |

FOREIGN PATENT DOCUMENTS

| | | |
|---|---|---|
| CN | 101940503 A | 1/2011 |
| CN | 102554711 A | 7/2012 |
| CN | 103229287 A | 7/2013 |
| CN | 103561677 A | 2/2014 |
| CN | 104116569 A | 10/2014 |
| DE | 103 36 390 A1 | 3/2005 |
| DE | 10 2016 222 210 A1 | 5/2018 |
| DE | 20 2018 104 325 | 9/2018 |
| DE | 202018104325 U1 * | 10/2018 |
| EP | 0637482 A1 | 2/1995 |
| EP | 1088620 A1 | 4/2001 |
| EP | 1 195 226 A1 | 4/2002 |
| EP | 2 9155 03 | 9/2015 |
| EP | 3 443 932 | 2/2019 |
| JP | S6016345 A | 1/1985 |
| JP | H07148634 A | 6/1995 |
| JP | H1058286 A | 3/1998 |
| KR | 20110092770 A | 8/2011 |
| WO | 2012/079637 A1 | 6/2012 |
| WO | 2018/009518 A1 | 1/2018 |

OTHER PUBLICATIONS

Written Opinion of the ISA for PCT/EP2020/055343 dated May 7, 2020, 15 pages.

International Search Report for PCT/EP2019/075238 dated Apr. 17, 2020, 10 pages.

Written Opinion of the ISA for PCT/EP2019/075238 dated Apr. 17, 2020, 11 pages.

Li et al., "Electromachining technology for complex surface of aeroengineintegral thin-wall structure", Aeronautical Manufacturing Technology, Feb. 1, 2018, vol. 61, No. 3, pp. 41-59.

Search Report, issued in Chinese Patent Application No. 201980061689.X dated Feb. 20, 2024.

Tan et al., "An experimental study on the effect of different optical impression methods on marginal and internal fit of all-ceramic crowns", West China Journal of Stomatology, vol. 28, No. 1, Feb. 20, 2010, pp. 29-33.

* cited by examiner

METHOD FOR PRODUCING A MOLDED BODY AND MOLDED BODY

This application is the U.S. national phase of International Application No. PCT/EP2020/055343 filed 28 Feb. 2020, which designated the U.S. and claims priority to EP Patent Application No. 19160402.4 filed 1 Mar. 2019, the entire contents of each of which are hereby incorporated by reference.

BACKGROUND OF THE INVENTION

Field of the Invention

The present invention relates to a method for producing a molded body, preferably a dental prosthesis, according to the preamble of claim 1. Furthermore, it relates to a molded body produced according to this method, preferably a dental prosthesis, and to a layered mold blank produced by means of the method.

The preferred field of application and the starting point of the present invention is the manufacture and subsequent modification of dental prostheses. However, the invention is applicable to the manufacture generally of workpieces and in particular to their subsequent machining, such as engine parts, car parts, aircraft parts, ship parts, machine parts, model making parts and other parts, tools, etc.

Description of the Related Art

Dental prostheses, in particular partial prostheses, are composed of several different materials such as e.g. synthetic materials having different colors and properties, and often a metal framework. The metal framework consists of metal or a metal alloy, e.g. a cobalt-chromium alloy, of titanium, stainless steel, or of a gold alloy. Different retaining and supporting elements such as clasps, attachments, implant abutments are provided as part of the metal framework or embedded in the dental prosthesis. The latter may consist of yet other materials. Both the prostheses and their components must be manufactured, machined, assembled, and mostly also finished with an accuracy of few micrometers. In the course of its manufacture, a new denture must be tried on, test worn, as the case may be, and corrected according to the patient's feedback.

For modifications to dental prostheses, subtractive (grinding, milling) and additive machining methods (3D printing, in particular metal laser melting processes) are being used. In all of these processes, the prosthesis (or generally a workpiece) must be precisely inserted in a defined position in the workpiece holder of the respective machine tool. However, such positioning with the required accuracy (usually in the order of 0.1 mm or better) is very complex and time-consuming.

If a dental prosthesis contains a metal framework, the pre-built metal framework is conventionally fastened to the model of the upper or lower jaw. Those parts of the metal framework which are embedded in the prosthesis need to be kept at a minimum distance from the surface of the model so that in the finished prosthesis, the metal framework is safely covered by the biocompatible body of the prosthesis, i.e. the metal cannot enter into contact with the gingiva and is furthermore securely connected to the surrounding prosthesis part so as to withstand the forces that occur during chewing. Another reason therefor is also that metal parts which enter into direct contact with the gingiva or are exposed need to be high-gloss polished, which is laborious. However, a high-gloss polish conflicts with a superior bond between the metal and the surrounding prosthesis material.

This distance, the so-called clearance, between the metal part and the surface of the gingiva is conventionally achieved by first applying a correspondingly thick layer of an easily removable material, usually a wax, to the model in this area. By means of this temporary mold, a duplicate is prepared from a refractory mold material and formed into a casting mold for the metal framework in the usual way. The wax is removed from the model and the metal framework is attached. The metal framework will now be suspended above the surface of the model in the areas that were covered by wax. The mold is closed again and the prosthesis material is filled in and will completely surround the metal framework in the sections where a clearance has been provided.

One disadvantage is that the plastic prosthetic material that comes into contact with the skin in prostheses manufactured in this way does not have an optimum composition and is therefore generally less well tolerated than a prefabricated material.

Another aspect in the manufacture of dental prostheses arises from the esthetic ambition to achieve a most natural, non-artificial appearance of the dental prosthesis. For example, dental prostheses milled from a monolithic blank appear obviously artificial. One reason is that teeth and gingiva are composed of different layers which create a subtle but distinct optical impression depending on their thickness. In the replica, an approximating effect can be achieved by composing the prosthesis as well as the teeth from layers each creating a different optical impression. In addition, these layers should also have irregular surfaces. Experience shows that layers having flat or plane surfaces also result in an artificial appearance.

A layered mold blank or raw body for the manufacture of dental prostheses is known from WO-A-2018/009518. However, the parting surfaces between the plates are plane or only provided with elevations globally in schematically predetermined areas. A disadvantage of this solution is that the shape resulting from measurements performed on a patient, the—e.g. for esthetic reasons—inner layering and the course of boundaries between the layers has to be adapted to the given structure of the mold blanks. Also, the embedding of a metal framework, which on one hand serves for connecting separate prosthesis parts (e.g. left and right molars when incisors still present), and on the other hand is required for the stability of the prosthesis itself, is not indicated.

SUMMARY OF THE INVENTION

One object of the present invention is to provide a method for a simpler manufacture of a molded body having at least one inner parting surface in a defined arrangement relative to its surface.

Another object may be seen in designing the precise positioning of individual components during the manufacture of a molded body in a machine tool both individually and jointly in such a manner that a greater mechanical and a smaller manual proportion in the procession operations is possible.

A corresponding method is described in claim 1. The further claims indicate preferred embodiments of the method, a mold blank produced according to the method, and a product manufactured by means of the method.

Generally, as compared to the conventional manufacturing method, some process sequences are carried out in a modified order and some materials are used several times.

Thus, for example, the plastics model on which the metal casting framework is fitted, i.e. positioned and precisely adapted to the surface shape, simultaneously serves partly as the prosthesis base or body and as a retaining device for the positionally accurate connection to the further components and during the final surface processing and possibly surface finishing. The negative counter that is preferentially prepared during the manufacture of dental prostheses and is conventionally produced from a separate material, consists of the material from which also the outermost layer of the prosthesis teeth is produced. Preferably, the outermost layer of the enamel of the prosthesis teeth can also be carved out by appropriate milling.

A preferred embodiment is as follows:

The individual components each have a positioning section that is preferably located outside the area covered by the workpiece. In this positioning section, one or more key structures are arranged. The key structures are designed so as to allow the individual components to be precisely mounted in a predetermined position on a base, usually a blank. The counter pieces to the key structures on the individual components, the blank key structures, are produced by the respective machine tool. Their position is therefore known in the coordinate system of the machine tool. Thus, the position of the key structures on the individual components relative to the impression of the reference of the workpiece, in particular a dental prosthesis, is also known. Overall, it is thus possible to precisely define the position of a workpiece (a dental prosthesis) attached to the blank or also to the impression of the individual components, as well as the exact positioning of the individual components via the key structures on the blank, relative to the coordinate system of the machine tool. By milling the duplicate, the machine shows in which position it is machining the workpiece. By using the individual components, the workpiece is then fixed in exactly that position.

By means of the key structures (or reference marks) or generally of the referencing means, the individual components are aligned to one another in a positionally accurate manner.

Examples of such reference marks are those from the earlier patent application no. EP18195720.0 to the applicant of the present invention. Excerpts of this application are joined to the present invention as an appendix.

BRIEF DESCRIPTION OF THE DRAWINGS

The invention is further explained by means of an exemplary embodiment and with reference to figures showing.

DESCRIPTION OF THE PREFERRED EMBODIMENTS

Figure 1:
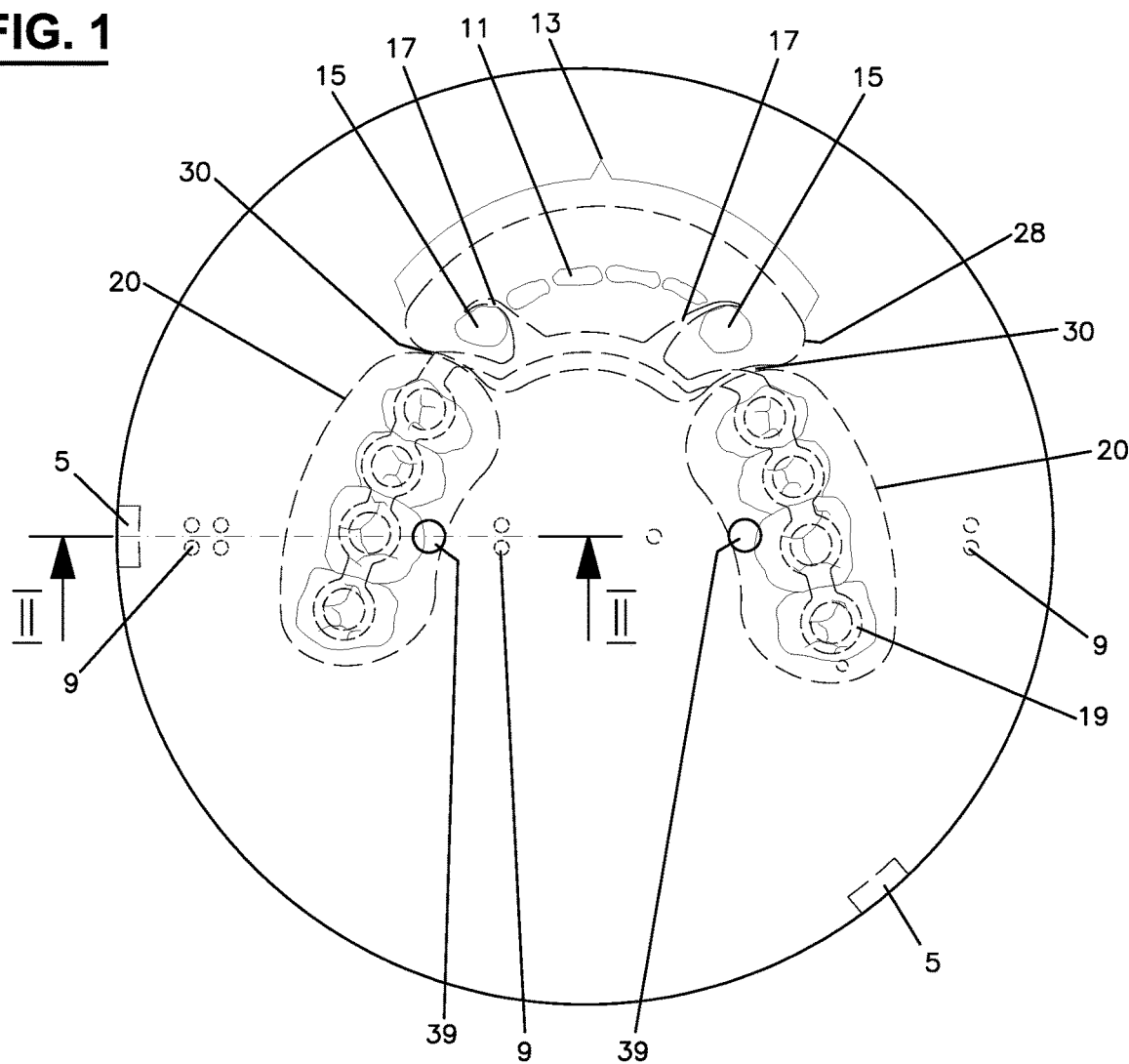
FIG. 1 top view of a blank with a counter placed thereon, corresponding to a lower and an upper mold blank part.
Figure 2:
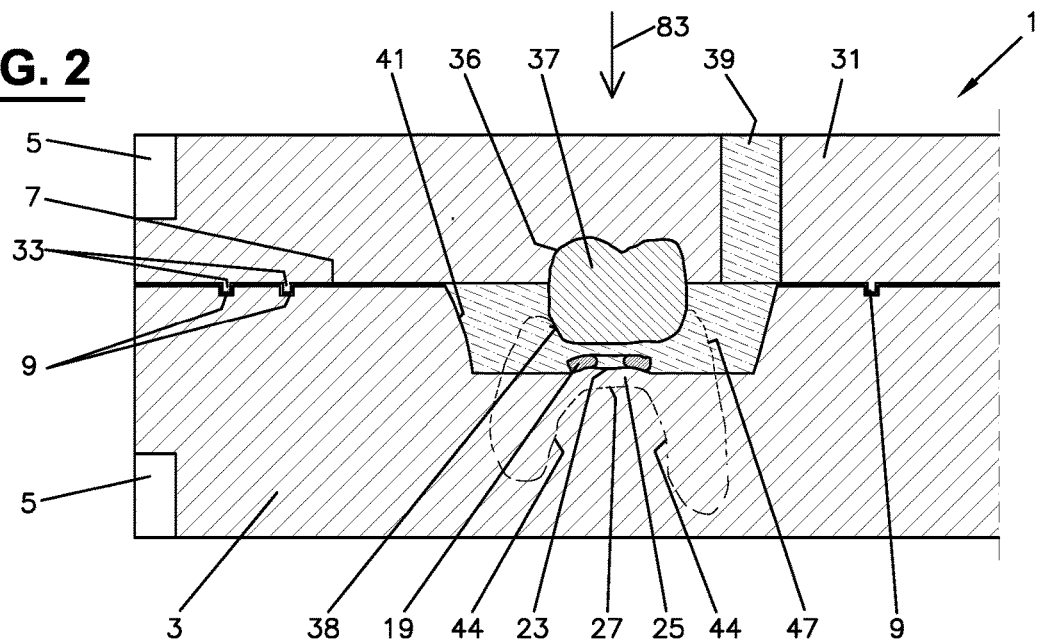
FIG. 2 section according to II-II in FIG. 1.
Figure 3:
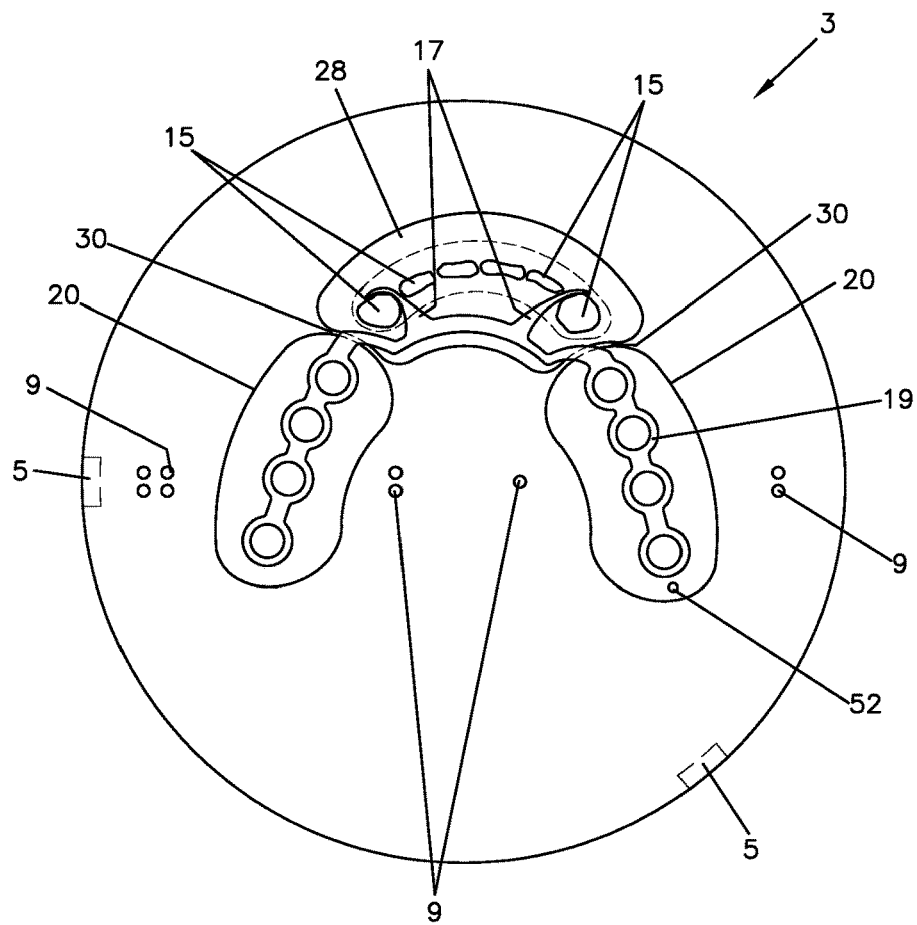
FIG. 3 top view of a blank according to FIG. 1

The applicant's earlier application EP18195720.0 describes a method for attaching parts to a blank in a precisely predetermined position relative to the blank in a reproducible manner and also, as the case may be, for reattaching them after their removal. The blank is characterized in that it is designed as a whole for being attached to a machine tool (additive or subtractive manufacturing). To ensure that this is done in a reproducible position, the blank is provided with reference marks. The latter are surface structures such as elevations or recesses, or possibly only graphic marks. The machine tool has corresponding mechanical provisions or optical detectors for the correct positioning relative to the coordinate system of the machine tool. Depending on the development of the technology, other measures to ensure this reproducible and known positioning of the blank relative to the coordinate system of the machine tool are also conceivable. Machining steps can then be performed fully automatically and in a reproducible position on the blank already, since the position of the machining steps on the blank can be predicted in the coordinates of the machine tool. By means of key structures which ensure that further parts can be attached to the blank in a known position relative to the blank, this automated machining capability also applies to these additional parts. The key structures can be elevations and recesses having a complementary shape. Various designs thereof are conceivable, such as cylindrical or polygonal structures. For increased precision, at least two or preferably three such structures at the greatest possible distance from each other are advantageous. Three structures are particularly advantageous if an exact positioning in space, i.e. relative to three coordinates, is required, which is often the case.

One possible arrangement is a group of three, four, five, or six studs which can be plugged into corresponding recesses in the other part similarly to a plug-in building block. The advantage of these key structures is that the parts can be juxtaposed in a precisely specified relative position without further effort. The achievable precision also meets the requirements of dental technology.

Another advantage is that the parts can be manufactured separately and that it is possible to connect them only when machining steps are necessary which require that the machining steps can be calculated in machine coordinates of the respective machine tool for automated execution.

In the present invention, specifically, the individual components are connected to each other in a positionally accurate manner with the aid of the key structures. Mold cavities created between them are filled with prosthetic material or dental material. After curing, both these molded materials and the components themselves serve as elements or components of the prosthesis. By connecting the components, an "alternating sandwich structure" is created, so to speak, as a raw body or mold blank, in which individual milled parts or layers are connected to other layers. More specifically, layers that have been milled from the solid components alternate with layers of cast and possibly also milled material. Instead of or in addition to milling, other processing steps of additive or subtractive manufacturing can be used.

FIGS. 1 to 4 show such a sandwich 1, here substantially a raw body 1 consisting of several layers with cavities filled with a flowable, curable material. The raw body 1 (or sandwich 1) thus represents a preliminary stage of a mold for forming a workpiece from a flowable material and is therefore called a mold blank.

Figure 7:
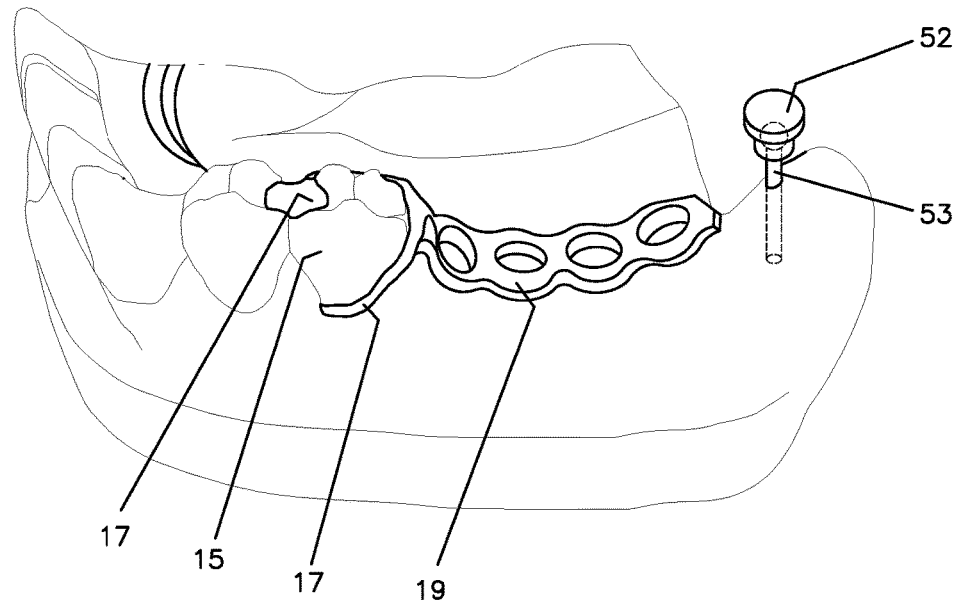
FIG. 7 partial 3D view of a blank with a metal framework and manipulating implant.

In blank 3, which is shown in FIG. 1 as the lower part of mold blank 1 and acts as a base or carrier, reference marks 5 in the form of recesses are incorporated on the outside, on the one hand, in order to be able to arrange blank 3 reproducibly in a machine tool. Key structures 9 are provided on surface 7. They serve to arrange another part of mold blank 1, in particular a so-called counter 31, in a positionally accurate manner on blank 3. In surface 7 of blank 3, for the exemplary manufacture of a dental prosthesis, an image of the jaw into which the prosthesis is to be inserted is essentially created. The model is divided into a section 13 left in a natural state, in which teeth 15 are still present, in particular, and to which the prosthesis is attached by anchoring elements 17 of the metal framework 19 (see FIGS. 1, 3, and 7), and areas 20 that are to be covered by the prosthesis, i.e. whose teeth are to be reproduced by the prosthesis and which are formed as recesses having a volume which exceeds that of the future prosthesis parts 21. Only the central bottom surface 23 (FIG. 2) is already designed as a support surface for metal framework 19. By the support surface, which is precisely adapted to metal framework 19, metal framework 19 is precisely positioned on blank 3 and thus also in the machine tool. This central bottom surface 23 runs around clearance 25 above the virtual gingival surface 27, the course of which was determined by measuring the patient's jaw.

Accordingly, the replicas of the natural teeth 15 are also arranged in a recess 28 which replicates this area of the patient's jaw to the extent that is necessary for fixing framework 19. Denture recesses 21 and recess 28 of the natural dentition parts are separated by walls 30 which prevent the passage of liquid denture material from recesses 21 into recess 28. Metal framework 19 is guided through recesses, for example slots in walls 30, which are subsequently again filled with suitable material to close walls 30.

Walls 30 can be omitted with the result that space 28 will be filled with flowable prosthetic material. In this case, however, the material around the exposed parts of metal framework 19 including retaining structures 17 must again be exposed, e.g. by milling. Since the metal framework as well as the entire prosthesis are available as a numerical model, the exposure may be time-consuming but otherwise requires little or no additional effort and furthermore can be optimized in such a way that only as much material is removed as is necessary to be able to remove prosthesis 20 and the exposed metal frame parts as well as anchoring elements 17 from the model.

On blank 3, counter 31 is placed, which at the same time represents the upper mold part for the subsequent casting of prosthetic material. Its predetermined position relative to blank 3 is precisely defined by key structures 33, whose shape is complementary to that of key structures 9 of the blank. Prefabricated teeth 37 are inserted in counter 31. For this purpose, counter 31 has cavities 36 which are arranged at the positions predetermined by the modeling of the prosthesis and into which teeth 37 are inserted and temporarily fixed, e.g. by an adhesive, but possibly also only by a narrow design of cavities 36, whereby a clamping effect is created.

In contrast to key structures 9, key structures 33 are raised. Such raised key structures 33 can be produced by removing material over a large area from the surface of counter 31. To reduce the effort, the counter can also be provided with islands, i.e. planar areas, from which the key structures are exposed by removing material. A third option is a recessed design and the provision of bidirectionally acting raised structures, such as centering pins or parts having bilaterally protruding structures such as pins. Finally, the counter and blank can also be manufactured, at least in part, in an additive process that readily allows the formation of raised structures on their surface.

Through casting channel 39, the mold cavity 41 is filled with flowable prosthesis material 43 (casting material). The result is the sandwich structure 1, in which the prefabricated teeth 37 as well as metal framework 19 are precisely positioned relative to each other and to the replicas of the natural teeth 15 thanks to key structures 9, 33. Teeth 37 form the irregular section 38 of the upper mold wall of mold cavity 41.

If possible, counter 31 is lifted off after the prosthesis material 43 has cured. However, further processing can also be carried out on the complete sandwich structure 1. First and foremost, the material of counter 31, as far as present, excess cast prosthesis material 43, and also material of blank 3 are removed by subtractive processes in order to finish surface 47 of the prosthesis, which has a gum-like appearance. Due to the precisely known location of artificial teeth 37, it is possible to expose even these without damage. All these machining steps can be carried out under computer control on the basis of the available data in the coordinates of the prosthesis since the relationship between the machine tool coordinates and the position of the denture parts is precisely known and determined due to reference mark 5 and key structures 9, 33.

Since machine tools are generally limited to performing machining from only one side, in this case from the upper side, i.e. from counter 31, it is necessary to subject sandwich 1, rotated by 180°, to a second machining operation from the bottom side. In this clamping position, the zones that can only be machined from below, such as the contact surface 44 on the virtual gingiva 27, can be machined. For technical reasons, webs 49 remain which connect the prosthesis to the remaining edge of blank 3 that serves for clamping in a machine tool. For economic reasons, any unnecessary material removal around the prosthesis is overall avoided since this generally only increases the time requirements.

Between the left and right prosthesis portions 21, a portion of sandwich 1 or blank 3, respectively, remains, and corresponding support structures 50 extending toward this central portion of blank 3 hold the prosthesis relative to this portion.

It is often necessary to embed additional fastening means in the prosthetic parts 21, such as a female part 52 which docks with the male part of an implant inserted in the patient's jaw. The position of this female part 52 must therefore also be precisely observed. For this purpose, a so-called manipulating implant 53 is attached in blank 3. The parameters (length, position) of the hole required therefor as well as the position of female part 52 can be precisely converted from model coordinates into machine tool coordinates, the length of manipulating implant 53 in conjunction with the depth of the hole determining the vertical position of the male part and thus of female part 52.

Figure 5:
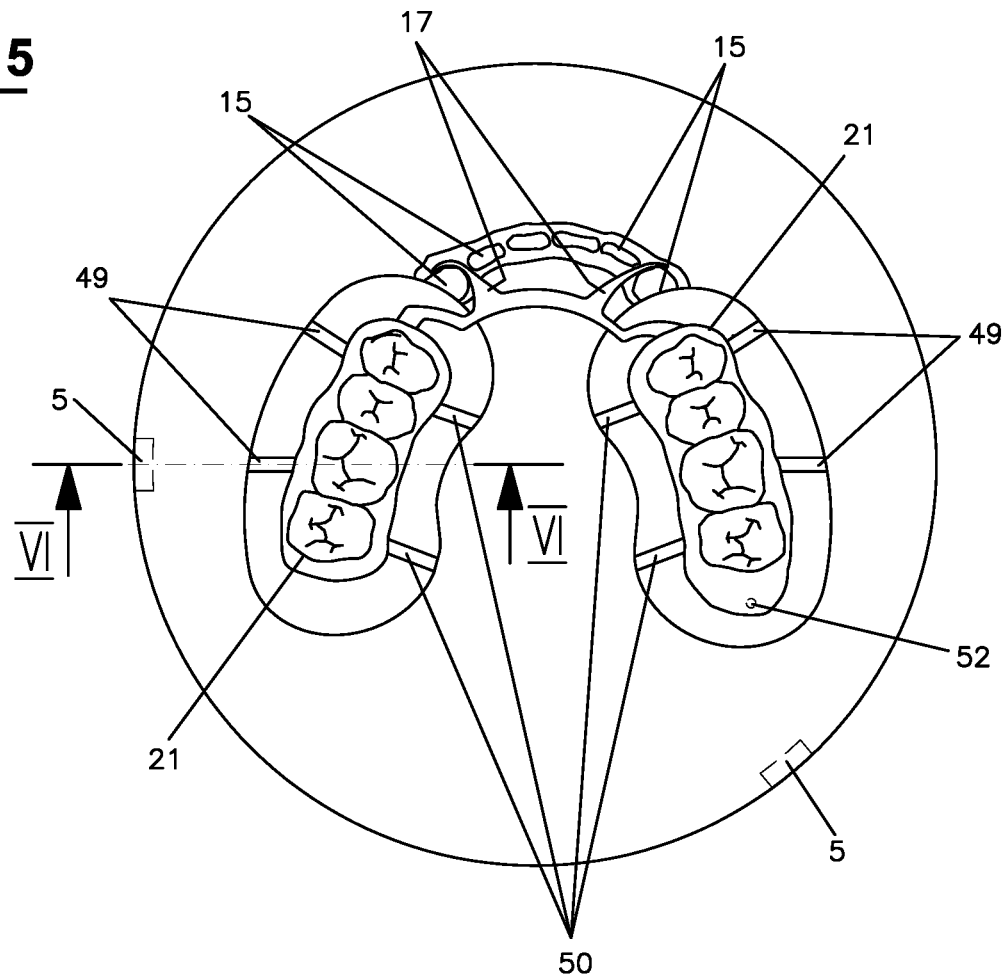
FIG. 5 section as in FIG. 4 after unmolding and mechanical processing.
Figure 6:
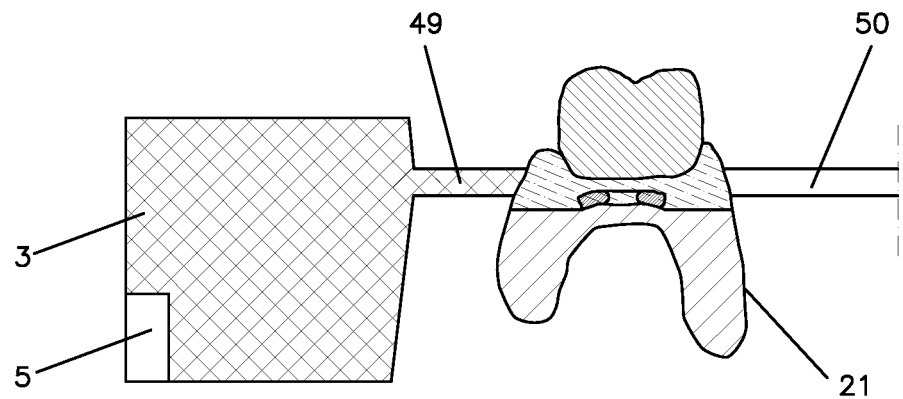
FIG. 6 section according to VI-VI through a counter with prefabricated teeth.

After exposing the prosthesis (see FIG. 5), the remainder of manipulating implant 53 is removed from the female part manually, e.g. with pliers (in FIG. 5, female part 52 is embedded in prosthesis 21 and therefore not visible).

Second Exemplary Embodiment

Figure 4:
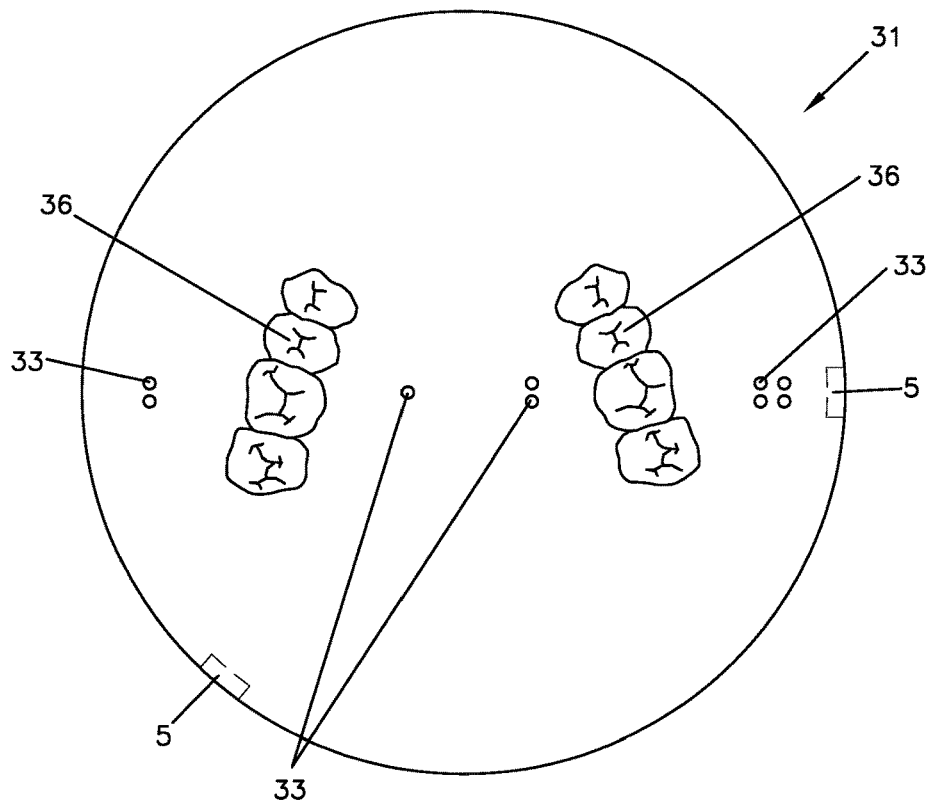
FIG. 4 bottom view of a counter according to FIG. 1.
Figure 8:
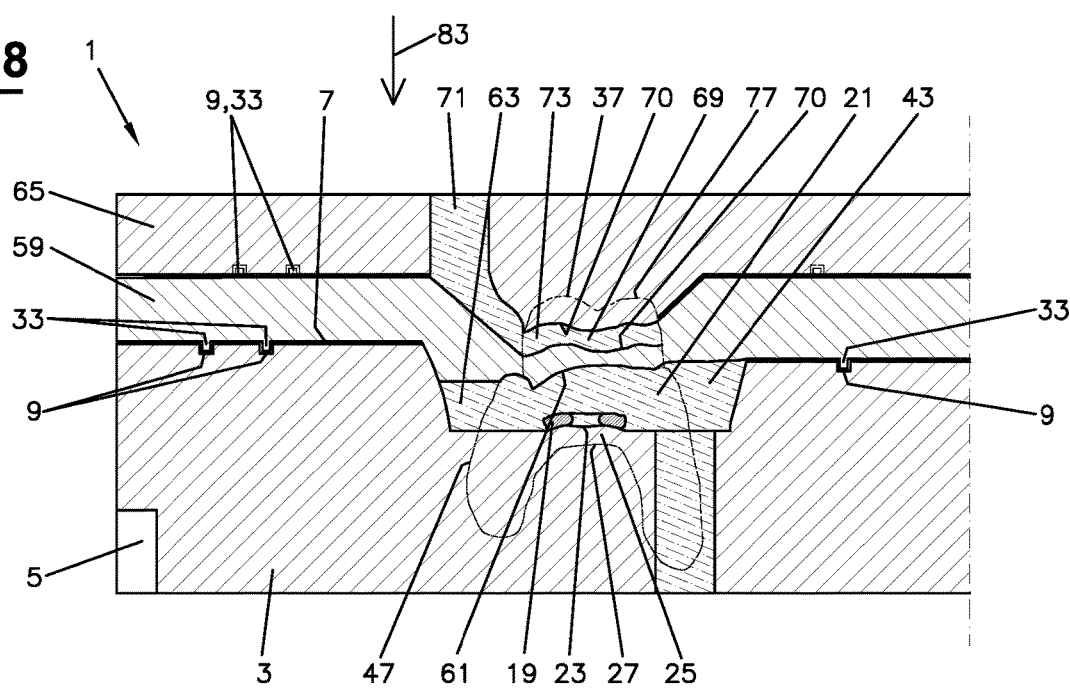
FIG. 8 section analogous to II-II of a second embodiment.
Figure 9:
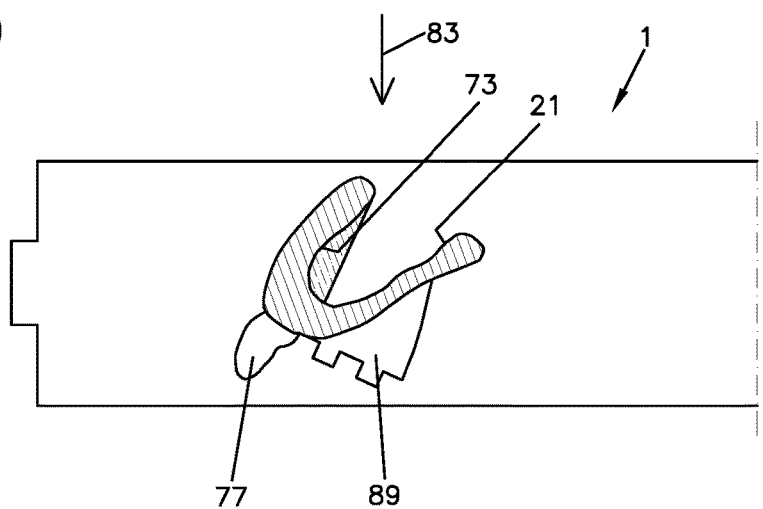
FIG. 9 schematized sectional view of a molded body analogous to VI-VI with a portion that is inaccessible for machining and an additional key structure.

FIG. 8 shows a cross-section in analogy to FIG. 4, but sandwich 1 is multilayered here. A first intermediate plate 59 lies on blank 3, the underside of which is provided with key structures 33 analogous to counter 31 of the preceding example. In the area of prosthesis sections 21, the underside 61 of intermediate plate 59 is shaped in such a way that it delimits a first mold cavity 63 upwardly, which extends approximately to the transition between the gum and the tooth. In other words, the aim is to replicate the gum by means of the material of the blank and of the pink-colored prosthesis material 43 (pink-colored in order to replicate gum) filled into the first molding cavity 63, as in the first embodiment. On intermediate plate 59 (e.g. suitable for replicating the tooth neck, yellowish-brownish color) lies cover plate 65 (e.g. suitable for replicating tooth enamel; color and other optical properties (transparency) are adapted to the representation of tooth enamel). On the contact surfaces, cover plate 65 and intermediate plate 59 are provided with lower and upper key structures 9, 33 analogous to the contact surface between intermediate plate 59 and blank 3. The position of cover plate 65 relative to blank 3 is thus also precisely determined. In the area of the teeth 37 to be reproduced, a second mold cavity 69 is provided between intermediate plate 59 and cover plate 65, into which dentine-colored prosthesis material 73 (i.e. suitable for reproducing dentine both because of color and other parameters) is filled via a casting channel 71. The boundary surfaces 70 of second cavity 69 are also irregularly shaped similar to nature. With regard to consistency and color, prosthetic material 73 is designed to form part of a tooth 69. In this exemplary embodiment, the gum replica is formed from the material of blank 3 and the first castable prosthesis material 43, and the tooth replica from the material of intermediate plate 59, cover plate 65 and the second castable prosthetic material 73.

Figure 11:
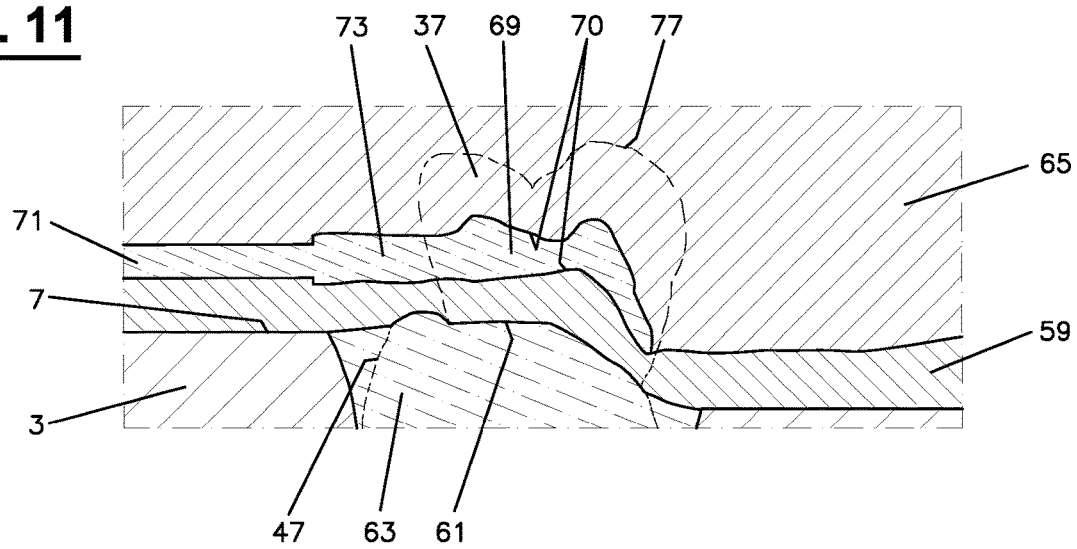
FIG. 11 enlarged detail of FIG. 8 with a more naturalistic layering.

FIG. 11 shows an enlarged detail of FIG. 8 of tooth replica 37, but with a different layering pattern. The layers are better adapted to natural conditions. In FIG. 11, on the right side, the tooth enamel replica extends through cover plate 65 down to intermediate plate 59 which provides the material for the tooth neck. Mold cavity 69 and thus the plastic second prosthetic material 73 thus end in front of the later wall of the tooth, so that the dentine replica layer made of the material 73 is covered by the enamel layer, analogously to a natural tooth, and is moreover also internally adapted to tooth surface 77.

After the castable prosthetic materials 43, 73 have cured, similarly as in the first embodiment, the material of sandwich 1 is removed along the virtual surface 27 of the gingiva and the surfaces 77 of imitation teeth 37, respectively, by subtractive processes such as milling.

This prosthesis is thus produced together with the artificial teeth in an integral, highly automatable manufacturing process. Both the imitation gingiva and the imitation teeth have the required layered structure to create a natural appearance. Obviously, it is possible to use more than one intermediate plate 59 for higher requirements or other applications of the described manufacturing process. The casting channels leading to further inwardly located mold cavities may be guided radially from the outside along the parting surfaces between the corresponding plates, or also from above and from below, in this case generally also a short distance radially along the corresponding parting surfaces.

Summary Presentation

1. A base is milled from a blank, especially from PMMA (polymethyl methacrylate);
2. A metal framework is milled, cast, or manufactured in another way known per se and placed on the base;
3. At least one plate is laid on the base, cavities being present between the base and the plates or between the plates, which are suitable for filling with a plastic molding compound and are accessible from the outside, the molding compounds simultaneously creating a connection between the plates or between the plate and the base. Both the plates and the base and the molding material are selected such that they can form part of the product being manufactured, in particular a dental prosthesis;
4. The prosthetic tooth base is milled from tooth-colored PMMA, more specifically on its upper and lower side, as the lower and inner part of the prosthetic tooth, respectively;
5. Unless prefabricated prosthetic teeth are used, the dentine core is preferably formed from a plastic molding material;
6. The enamel area of the prosthetic teeth is milled from the uppermost or possibly from several upper plates and cured plastic molding material located therebetween. Before they are joined together, the surfaces of the plates involved in the formation of the teeth are already machined, particularly by milling, in the area of the mold cavities in such a way that a near-natural layered structure results that is largely free of planes and flat surfaces.

The entire procedure for manufacturing a partial or full prosthesis can be summarized as follows:

1. A model of the jaw situation consisting of mucosal surface, teeth, prosthetic constructions (crowns, bridges, attachments, implant interface surfaces, etc.) is produced in a form suitable for being received in a processing device and from a material that will later serve as part of the finished prosthesis, for example as a prosthesis base and prosthesis body, wherein:
    1.1. Reliefs are already constructed on the model under the metal structures;
    1.2. The model
        1.2.1. consists of a prefabricated blank;
        1.2.2. is produced in a 3D printing process, possibly with subsequent subtractive and/or additive finishing; or
        1.2.3. is produced by filling a negative mold made by milling, 3D printing or another process known per se;
2. The metal framework is produced by model casting, milling, 3D printing or other methods known per se and adapted to the jaw situation manually or mechanically, placed, and fixed on the model if necessary, while the exposed framework areas such as the palatal plate or sublingual bar are also intended to be mechanically post-processed in the course of the final milling of the entire prosthesis;
3. Other retaining and/or supporting structures (attachments, implant abutments or similar) are placed in or on this model manually or mechanically;
4. Outside, but possibly also inside the area of the future prosthesis, key structures are placed with the aid of which the various blanks (parts consisting of solid material) can be positioned precisely in relation to each other for the manufacture of further prosthetic or auxiliary elements;
5. One or more blanks are produced which have sections for forming intermediate layers which accommodate e.g. tooth cores and additional denture construction elements. These blanks include mating keys on the bottom and/or top for attaching additional parts of this kind. In the simplest case, the blanks themselves are made of a material which, after subsequent milling, becomes part of the denture (gum, tooth component, e.g. enamel or tooth). The blanks may furthermore have the following properties and characteristics, for example:

- 5.1. They may have negative structures on their underside into which prefabricated, possibly assembled denture teeth can be inserted in a fixed, positionally accurate manner. These blanks can e.g. consist of:
  - 5.1.1. a thermoplastic (reusable) material;
  - 5.1.2. a non-reusable, alloplastic material; or
  - 5.1.3. a magnetorheological reusable material, in particular together with a softening and/or hardening device required for this process, such as a device provided with magnets.
- 5.2. They contain prosthetic tooth blanks or teeth produced directly in a 3D printing or a similar process known per se in one or more layers, which are preferably finished in a milling process;
- 5.3. They contain only the inner prosthetic tooth cores made of a tooth-colored prosthetic tooth plastics material, the upper and lower sides being shaped according to the layer geometry of the prosthetic teeth and adapted to the underlying prosthesis layer.
6. The aforementioned mold blank parts are placed on the model, which forms layer 1, as odd-numbered layers starting with layer number 3, the key structures being used for their exact, predetermined positioning relative to each other, and the uppermost (enamel) layer, which forms the last mold blank part placed on top, being initially machined only on its underside.
7. The cavities present between the model and the other mold blank parts, which form the even-numbered layers starting with number 2, are filled with plastic denture material in the respective color (pink or tooth-colored according to the respective layers) in one of the following procedures to chemically and/or mechanically/physically connect the individual denture layers:
  - 7.1. An injection process in which the material is supplied via channels arranged in the mold blank parts;
  - 7.2. a tamping method.
8. Finally, the complete prosthesis with all its elements is milled out of the solid, so to speak, from the sandwich formed by the combination of the model, the mold blank parts and their intermediate cured layers of plastic prosthetic material.
9. Mechanical post-processing is possible if the prosthesis is fixed in a workpiece holder and referenced in the workpiece holder by scanning and comparing it to the numerical model data on the basis of which the prosthesis was milled from the sandwich structure in step 8, thus establishing a relationship with the machine tool coordinates.

Thus, the mold blank parts generally have two functions. On the one hand, they represent walls of the mold cavity and serve for positioning and clamping purposes in a machine tool. On the other hand, they form part of the product. Possibly, in the case where prefabricated components, such as teeth 37, are inserted into a mold part, the latter is usually removed substantially completely. However, even in the latter case it is conceivable that the mold part also forms part of the product.

Heavily Undercut Areas

Parts of a denture, in particular the concave part of the gingival replica which rests on the jaw, may include areas 79 oriented at such an angle to the normal machining direction 83 or have an undercut nature that they cannot be machined in a normal clamping position by conventional machine tools. With reference to FIG. 4, the normal machining direction can be considered to be from above, according to arrow 83, and the opposite direction.

Figure 10:
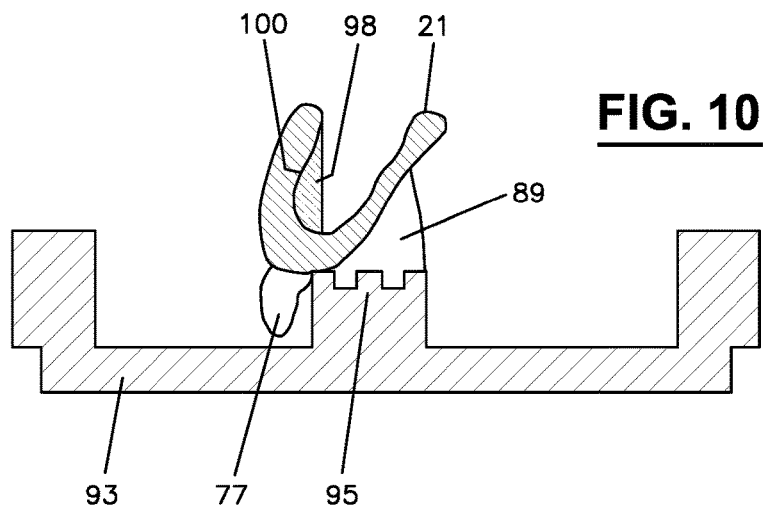
FIG. 10 section of an inverted clamping of a molded body for machining sections that are difficult to access.

This problem can be solved by forming an auxiliary key structure 89 at a suitable location of one of the prosthetic components 21, as shown in FIG. 10. In this figure, the other components of sandwich 1 are not shown in detail, but a construction as in the preceding exemplary embodiments is assumed.

After its manufacture, particularly in accordance with the preceding exemplary embodiments, whereas some prosthesis material 98 could not be removed, the prosthesis is positioned by means of the auxiliary key structure in a corresponding workpiece carrier 93 having a corresponding complementary key structure 95. Since the location of the key structure 95 relative to the prosthesis is exactly known from the design data, as is that of the complementary key structure 95 in workpiece carrier 93, a transformation into machine tool data can be performed numerically for the removal of the excess prosthesis material 98, so that this removal can be carried out in an automated manner. Due to the new position of prosthesis 21 in workpiece carrier 93, the virtual surface 100, which still has to be formed by a machining process such as milling by removing the excess material 98, has been pivoted in a suitable direction that is sufficiently compatible with the working direction 83 of the machine tools so that it is now easily accessible by the tools. After the machining step, the auxiliary key structure 98 is removed in a suitable manner, e.g. by breaking or cutting it off.

From the preceding exemplary description it is apparent that in a method for producing a molded body, several mold parts are stacked, in particular a blank and one or more mold plates placed thereon. Adjoining surfaces are provided with respective matching, in particular complementary referencing means such as recesses and elevations, so that the mold plates can be arranged relative to one another and to the blank in exactly one defined position. One possibility of such pairs of referencing means is a design as in plug-in building blocks, i.e. at least one, preferably two or more groups of one, two, three, four, or more studs and, complementary thereto, at least one recess into each of which a respective group of studs can be inserted. As in the case of plug-in building blocks, it may be sufficient that the recesses only reproduce the circumference of the respective group exactly, i.e. form line contacts with the outermost stubs during assembly, rather than having a matching recess for each individual stud. This facilitates the assembly of the mold parts.

In a generalized manner, according to a first aspect, the uppermost mold part (counter or "first" mold plate) and the lowermost mold part (blank) are provided with corresponding referencing means, the correspondence being achieved either directly or indirectly via one or more "second" mold plates arranged between the blank and the first mold plate so that overall the position of the first mold plate relative to the blank is defined by the referencing means, as is that of the second mold plates optionally arranged therebetween.

In the adjoining surfaces of the mold parts (mold plates, blank), respective recesses are formed in one or both mold parts which form a mold cavity per surface pair. After filling casting material into the cavities and its curing, a mold blank having a sandwich structure of mold parts and casting material is produced. Out of the latter, the molded body is machined primarily by material removal, e.g. by milling. In the area of the surfaces of the molded body, it is necessary that excess material, including cast material, is present to enable a cutting (subtractive) machining method. Therefore, the cavities into which the casting material is filled are oversized at least in such areas, i.e. their casting volume is larger than that of the molded body obtained from the mold blank by material removal.

From another perspective, the mold blank from which a molded body such as e.g. a prosthesis is formed by machining in a machine tool comprises an arrangement of at least two mold parts. The blank is one such mold part, on which at least one mold plate is placed as another mold part to form the mold blank. On the adjoining surfaces of two respective mold parts, the aforementioned referencing means are formed so that adjoining mold parts can be attached in a predetermined position relative to each other. A respective mold cavity is formed in each of two adjoining surfaces. Both or one of the two surfaces have at least one recess which forms the wall of the respective cavity.

In one mold plate, preferably the uppermost one, preformed parts, e.g. teeth, can be inserted, a part of which projects into the mold cavity. As a result, these parts are anchored in the casting material after filling the mold cavity.

According to a third definition, it can be said that the mold blank consists of two mold parts, namely the blank and a "first" mold plate. To form a multilayered molded body, the "first" mold plate is divided into a "reduced" first mold plate and at least a "second" mold plate arranged between the reduced first mold plate and the blank. The referencing means on the original "first" mold plate, which serve for the exact relative positioning of the "first" mold plate on the blank, are then located on the "second" mold plate that adjoins to the blank. Between two respective mold plates and also between a "second" mold plate and the blank, there is a mold cavity formed by a recess in one or both of the respective adjoining surfaces.

From the foregoing description of exemplary embodiments of the manufacturing method according to the invention and of products made therewith, additions and variations are accessible to one skilled in the art without departing from the scope of protection of the invention, which is defined by the claims. Conceivable options are, among others:

Application of the manufacturing method to other workpieces, especially layered workpieces such as skis;
Manufacture of workpieces in which the bending or fracture behavior is modified in a controlled manner in defined areas;
Use for the manufacture of workpieces which do not have homogeneous properties, such as composite materials, and which in particular shall have modified properties in different locations with respect to:
 physical or chemical core and/or surface properties, strength, flexural behavior;
Manufacture of workpieces that are required to include holding, supporting, and other connecting elements in their body.
A cavity can also be subdivided, e.g. for two essentially separate parts of a denture resting on the right and left jaw, respectively.
Two (or more) cavities may be connected to each other through a mold plate to form a continuous mold to be filled with a material.
The referencing means are at least partly realized by pins, bolts or the like, which are inserted into matching bores in the respective molded part. It is thus avoided that large amounts of surrounding material of the respective molded part must be removed to form the protruding parts.

APPENDIX

Excerpt from EP18195720.0

The invention claimed is:

1. A method for producing a molded body having a shaped surface and having an inner parting surface, the shaped surface and the inner parting surface being arranged in the body relative to one another in a predetermined manner, wherein
 forming a first part of a mold cavity for a first part of the molded body on a blank in a mold blank, the inner parting surface being part of a wall of the mold cavity, the mold blank having first and second referencing means, the first referencing means being suitable for arranging the mold blank in a processing machine in a predetermined position of the parting surface, and the second referencing means being configured to attach at least one first mold plate to the blank in a defined relative position in order to complete the mold,
 placing the first mold plate on the blank, the first mold plate having a third referencing means corresponding to the second referencing means, and a second part of the mold cavity for the molded body,
 wherein the mold cavity is filled with casting material,
 arranging the mold blank in at least one processing machine by means of the first referencing means, the referencing means ensuring that processing operations in the coordinate system of the molded body can be transformed into the coordinate system of the at least one processing machine, and at least some mold blank parts and casting material are removed by processing operations in the at least one processing machine in order to shape substantially the surface of the molded body that are required for processing, to obtain the mold blank.

2. The method according to claim 1, wherein the mold cavity forms a casting volume that is larger than the corresponding part of the molded body.

3. The method according to claim 1, further comprising placing components of the molded body in the second part of the mold cavity while at least an effective portion of the molded body components projects from the mold wall in order to fasten the molded body components to the molded body by embedding the projecting portion in the casting material.

4. The method according to claim 1, further comprising attaching the at least one first mold plate to the blank using the second referencing means, wherein prior to attaching the at least one first mold plate, at least part of an embedding member is laid onto a first mold wall of the mold cavity in order to be able to embed the embedding member in the molded body.

5. The method according to claim 1, wherein at least one of the parts that form a wall of the mold cavity consists of a material of the molded body so that these parts can form part of the molded body.

6. The method according to claim 1, wherein at least one second mold plate is arranged between two mold parts selected from first mold plate, blank, and if provided, one or two additional second mold plates, the at least one second mold plate forming respective mold cavities with adjoining mold components, and the at least one second mold plate and the adjoining mold parts being provided with mutually complementary referencing means, so that the at least one second mold plate can be placed between the adjoining mold parts in a predetermined relative position.

7. The method according to claim 1, wherein at least one surface of the mold blank and the mold plates which form parts of the wall of mold cavities and remain inside the molded body after the molded body is completed are not plane in order to obtain a layered structure in the molded body with uneven parting surfaces between the layers.

8. The method according to claim 2, further comprising placing components of the molded body in the second part of the mold cavity while at least an effective portion of the molded body components projects from the mold wall in order to fasten the molded body components to the molded body by embedding the projecting portion in the casting material.

9. The method according to claim 2, further comprising attaching the at least one first mold plate to the blank using the second referencing means, wherein prior to attaching the at least one first mold plate, at least part of an embedding member is laid onto a first mold wall of the mold cavity in order to be able to embed the embedding member in the molded body.

10. The method according to claim 3, further comprising attaching the at least one first mold plate to the blank using the second referencing means, wherein prior to attaching the at least one first mold plate, at least part of an embedding member is laid onto a first mold wall of the mold cavity in order to be able to embed the embedding member in the molded body.

11. The method according to claim 2, wherein at least one of the parts that form a wall of the mold cavity consists of a material of the molded body so that these parts can form part of the molded body.

12. The method according to claim 3, wherein at least one of the parts that form a wall of the mold cavity consists of a material of the molded body so that these parts can form part of the molded body.

13. The method according to claim 4, wherein at least one of the parts that form a wall of the mold cavity consists of a material of the molded body so that these parts can form part of the molded body.

* * * * *